Nov. 12, 1963    R. A. RAMEY ETAL    3,110,876
ELECTROMAGNETIC LOG
Filed May 29, 1956    2 Sheets-Sheet 1
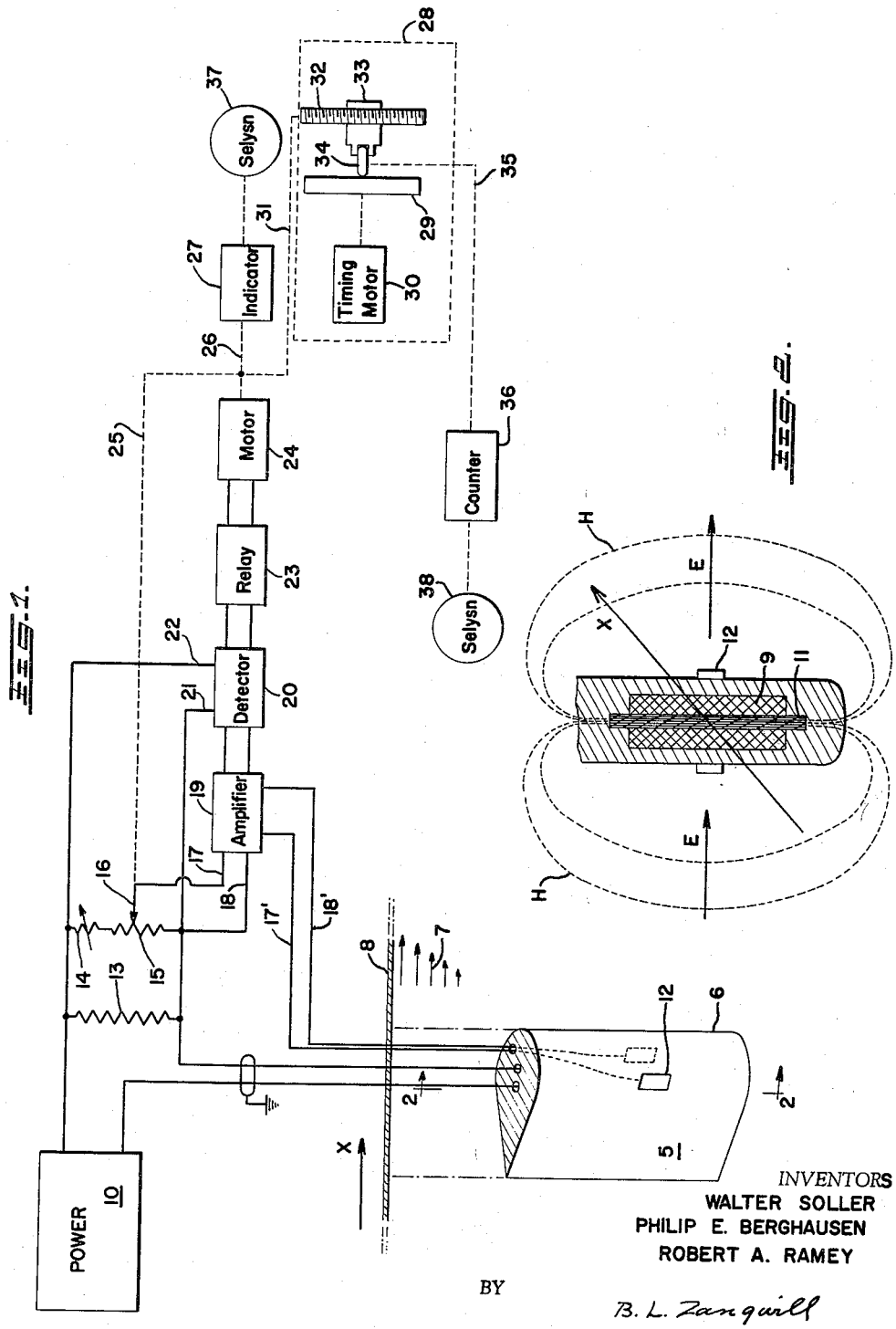
INVENTORS
WALTER SOLLER
PHILIP E. BERGHAUSEN
ROBERT A. RAMEY
BY
B. L. Zangwill
ATTORNEYS

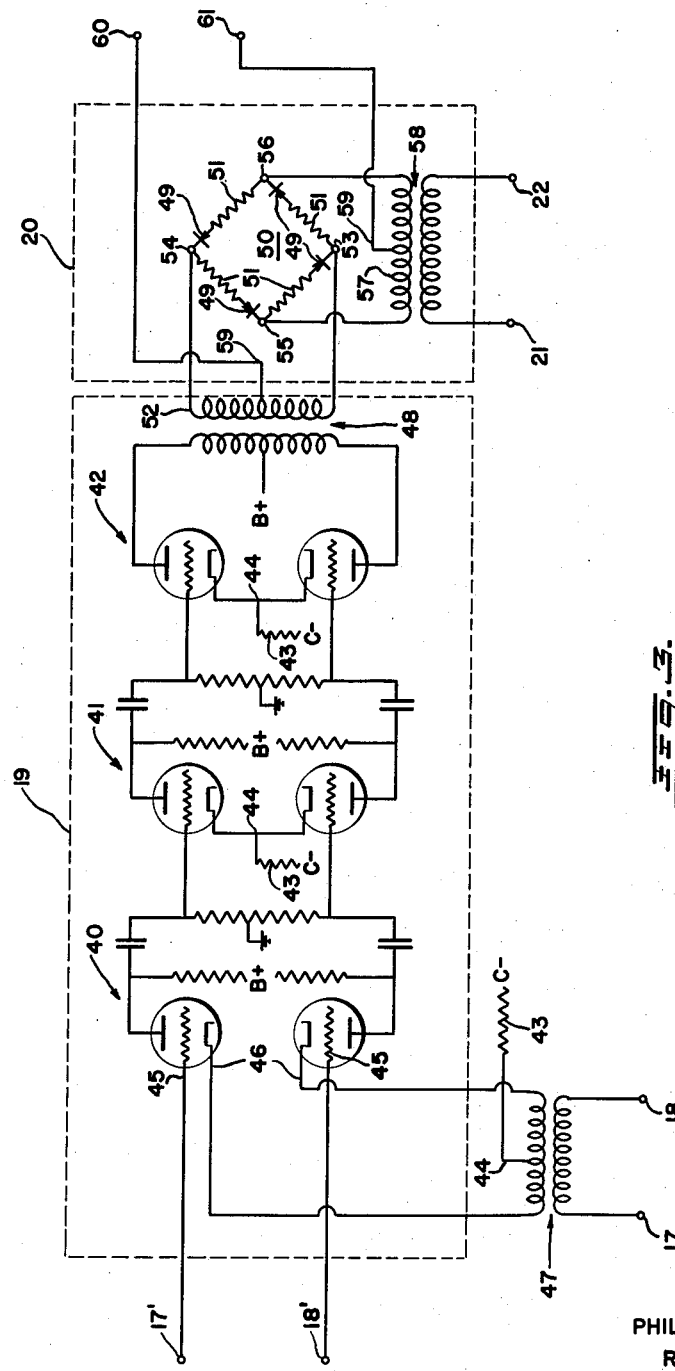

3,110,876
ELECTROMAGNETIC LOG

Robert A. Ramey, Library, Pa., and Walter Soller and Philip E. Berghausen, Cincinnati, Ohio, assignors to the United States of America as represented by the Secretary of the Navy
Filed May 29, 1956, Ser. No. 588,202
2 Claims. (Cl. 340—4)

This invention relates to fluid velocity measuring devices, more particularly it relates to an electromagnetic underwater means for measuring the speed of a ship through water, and specifically relates to a measuring and indicating circuit and apparatus embodying an electromagnetic log for accurately indicating the speed and distance traveled by a ship.

Heretofore, practicable devices for measuring the velocity of a ship through water utilized mechanical devices responsive to the force of flowing water exerted thereon, hydrodynamic devices responsive to differential pressures, thermal devices responsive to cooling rates effected by flowing water, and sonar devices which utilized the "Doppler" principle. These and other devices suffered many disadvantages; and their responses were affected by such factors as friction of moving parts, salinity, pressure, density, and temperature variations in the water. Calibration of such devices was difficult with the result that high-accuracy measurements of velocity could not be obtained without elaborate and expensive compensatory schemes.

Among the devices known to the prior art for measuring the speed of a ship are electromagnetic logs. However, electromagnetic logs of the prior art utilized sensing elements or electromagnetic units that were supported near or flush with a ship's hull and that employed direct current fields. As the water adjacent a moving ship's hull also moves but at different rates, the velocities measured were not the true ship's velocities. Furthermore these devices required relatively large power inputs in order to set up a magnetic field sufficient to produce a measurable signal voltage, but in spite of the high power, the signal voltage obtainable was so small in magnitude as to be frequently masked by variations in electrolytic and extraneous potentials.

In theory and practice, water in which ships move may be considered a continuous conducting medium. When an alternating magnetic field is established in this medium, an alternating electromotive force is induced around any closed circuit in the water due to the time variation of the magnetic flux and to the relative motion of the water with respect to the field. This induced electromotive force or voltage, E, is perpendicular to the direction of motion of the water and has a value:

$$\text{curl } E = \frac{\partial B}{\partial t} + \frac{\partial B}{\partial X} V$$

where $$\frac{\partial B}{\partial t}$$

is the time derivative of the flux density, and $$\frac{\partial B}{\partial X}$$

is a spacial derivative of flux intensity as a coefficient of the velocity, $v$. The first term is an ordinary transformer voltage considering the water as a secondary coil; while the second term is a voltage proportional to the velocity of the ship. This induced voltage may be measured by cutting the closed circuit and locating a suitable non-conducting plane in the fluid with its plane surfaces parallel to the direction of motion, and mounting a pair of electrodes insulated from each other on opposite sides of the plane surfaces of the non-conducting member and in electrical contact with the water. However, the transformer voltage is of a greater magnitude than the velocity and voltage and ordinarily masks out the velocity voltage.

This invention is an improved apparatus for very accurately measuring the velocity of a body moving relatively to a conducting fluid; and in particular for measuring the speed of a ship with respect to water without any of the disadvantages of the prior art. A special feature of the invention is the minimizing of the effect of the factor of induced voltage that arises from transformer action and that is not directly related to the ship's speed.

In general, an electromagnetic log comprises an electromagnetic unit or a rodmeter which establishes the magnetic field and senses induced voltages, and a circuit connected to the rodmeter which measures said voltages and converts them to indications of speed and distance. In order to establish the fields, the rodmeter comprises a field establishing means in the form of a coil that can be energized by an exciting current, and comprises pickup electrodes for sensing the voltages. In accordance with this invention, the construction of the rodmeter is such that the magentic field is so aligned with respect to pickup electrodes as to substantially eliminate transformer voltages; and the measuring circuit is such that any remaining transformer voltages due to misalignment of the field are separated from the velocity voltage by taking advantage of the fact that the transformer voltages are 90° out of phase with the desired velocity voltages. The rodmeter is so constructed that its magentic circuits have negligible core losses, whereby the magnetic flux will be in phase with and proportional to the exciting current of the rodmeter; and since the velocity voltage is in phase with the flux and proportional to its density, the velocity voltage will also be in phase with the exciting current. To further increase the utility of the invention, the measuring circuit to which the rodmeter electrodes are connected has a high-input resistance as compared with the resistance of the water between the electrodes. Consequently, variations in the latter resistance have minor effects, and the velocity voltage is independent of the conductivity of the water since it may be assumed that eddy currents are negligible. Furthermore, the rodmeter is streamlined or faired; and is supported from the keel of a ship so as to be in a region where the water flow is substantially unaffected by the ship's motion.

Briefly, the measuring circuit comprises a resistance in series with the coil generating the magnetic field. The voltage drop across this resistance is utilized as a reference voltage. A calibrated potentiometer is connected across this resistance and supplies a fraction of the reference voltage in phase opposition to the measured velocity voltage to an amplifier whose output is a signal or error voltage proportional to the difference between the measured velocity voltage and the fraction of the reference supplied to the amplifier by the potentiometer. This difference signal is applied to a phase sensitive detector with the reference voltage which, being of the same phase as the rodmeter exciting current and the measured velocity, enables the phase sensitive detector to ignore extraneous voltages other than the velocity voltage or speed signal. The error voltage is converted in the phase sensitive detector to a direct current signal of a sense that depends on whether the velocity voltage or speed signal is greater or smaller than the fraction of the reference voltage across the potentiometer. A reversible motor responsive to the output of the phase sensitive detector adjusts the potentiometer so that the fraction of the reference voltage can be made equal to the velocity voltage. The adjustment of the potentiometer is then an indication of ship's velocity independent of exciting current since both the velocity voltage and reference voltage are in phase with and proportional to the exciting current.

Accordingly, an object of the invention is to provide a practicable electromagnetic underwater log.

A further object of the invention is to provide a rodmeter for producing voltages proportional to relative fluid velocity wherein said voltages are independent of variations in the characteristics of the fluid and of transformer voltages.

Another object of the invention is the provision of an electromagnetic underwater log adapted to measure speed and distance traveled by a ship.

Another object of the invention is to provide an electromagnetic log for measuring speed which is free of errors due to extraneous magnetic fields.

Other objects and many of the attendant advantages of this invention will be readily appreciated as the same becomes better understood by reference to the following details and descriptions when considered in connection with the accompanying drawings in which like reference numerals designate like parts throughout the figures thereof, and wherein:

FIG. 1 is a block diagram of an electromagnetic log system;

FIG. 2 is a schematic sectional view, substantially along lines 2—2 of FIG. 1, of the rodmeter utilized in the system; and FIG. 3 is a schematic diagram of an amplifier and phase sensitive detector employed in the system of FIG. 1.

Referring now to the drawings, wherein like reference characters designate like or corresponding parts throughout the several views, there is shown in FIG. 1 a rodmeter generally designated by reference 5 which comprises a streamlined non-magnetic strut 6 adapted to project into the water below the keel 8 of a ship. As may be seen from FIG. 1, the flow of water when the ship is moving in a direction X is indicated schematically by arrows 7. This flow is with the ship immediately adjacent thereto due to friction of the hull, and continues in the same direction with decreasing magnitude to a depth proportional to the ship's speed. The flow finally becomes relatively undisturbed with respect to the direction of the ship. It is within this region of relatively undisturbed flow that the active elements of the rodmeter depend to substantially eliminate errors due to erratic or turbulent flow.

Within the strut 6 and insulated from the water, is a sensing unit comprising a coil 9 symmetrically positioned about a ferromagnetic core (FIG. 2). The coil is excited from a relatively low frequency alternating power supply 10, preferably a generator providing a 50-cycle supply so as to avoid the 60-cycle stray voltages. In conjunction with the ferromagnetic core material 11, the exciting current flow through coil 9 establishes an alternating magnetic field H about the rodmeter. The sensing voltage pickup electrical elements are a pair of relatively insulated metal and preferably platinum electrodes 12 symmetrically positioned along opposite sides of the strut with respect to the coil and core. The symmetrical construction places the electrodes 12 in a region where the magnetic flux H flows in a substantially vertical direction whereby transformer voltages which are induced in the water are substantially cancelled regardless of whether the rodmeter is stationary or moving with respect to the water. A rodmeter embodying the foregoing and other features is shown and claimed in application Serial No. 588,203, filed on even date herewith.

As the water moves relative to the rodmeter in a direction normal to the magnetic flux H (FIG. 2) its motion creates an electric field E normal to the magnetic flux, to the flow of water, and to the direction of motion X of the ship. The insulated sensing unit of the rodmeter creates a barrier which establishes an electrical circuit in the water between the electrodes 12, and a difference of potential proportional to velocity is obtained on opposite sides of the barrier between the electrodes.

Connected in series with the coil 9 and the alternating power source 10 is a resistor 13 across which is developed a reference voltage having the same phase and frequency as the rodmeter exciting coil current. This reference voltage is connected in parallel with a scale setting rheostat 14 in series with a potentiometer 15. The potentiometer 15 has an adjustable arm 16, and the voltage between the adjustable arm and the lower end of the potentiometer is applied to terminals 17 and 18 for application to an error amplifier 19.

As shown in FIG. 3, the signal voltage from the pickups 12 is fed by conductors 17' and 18' to the error amplifier 19 in series opposition to the voltage across the adjustable arm 16 of potentiometer 15. The output of the error amplifier 19 or the error voltage is connected to the phase sensitive detector 20. The reference voltage across resistor 13 is also applied to a phase sensitive detector 20 via conductors 21 and 22. The output of the phase sensitive detector 20 controls a single pole double throw polarity sensitive relay 23 which in one position operates a first shaded pole relay and in the other position operates a second shaded pole relay, the shaded pole relays being connected selectively in the operating circuits of a reversible motor 24 according to the sense of the direct current from the phase sensitive detector 20. The shaded pole relays close either one or the other of the shaded pole coils of the reversing motor 24 to cause the motor to rotate in one direction or the other depending on which shaded pole relay is energized. In the neutral position of the relay 23, the motor 24 is stationary.

Mechanically coupled to the reversing motor 24 through suitable shafts 25 and 26 which follow the rotation thereof are the adjustable arm 16 of the potentiometer 15 and a dial of a speed indicator 27 calibrated linearly in speed units. Connected similarly to the reversing motor 24 is a speed integrating device 28.

The speed integrating device 28 comprises a rotating table 29 driven by a synchronous or timing motor 30. The rotary output of reversible motor 24 is mechanically geared by a shaft 31 to a screw 32 which is arranged to adjust the position of a carriage 33. Frictionally mounted between the table 29 and carriage 33 is a roller mechanism 34 adapted to move with the carriage. As is apparent the rate of rotation of roller mechanism 34 will be in accordance with its position with respect to the center of the rotating table 29. Hence radial displacements of the carriage 33 as determined by speed are converted into rotary motions proportional to distance traveled. Suitably geared to the roller mechanism 34 through a shaft 35 is a distance indicator or revolution counter 36. Selsyns 37 and 38 geared to the speed and distance indicators may be employed to transmit information to remote areas on the ship.

Referring now specifically to FIG. 3 for the details of the error amplifier 19 and phase sensitive detector 20, the amplifier comprises three cascaded stages 40, 41 and 42 of balanced push pull amplification. Triodes are shown only for purposes of illustration it being understood that other types of tubes, such as pentodes, may be employed as well. Each of the stages is provided with a large unbypassed resistor 43 in the common cathode connections 44 which reduces amplification of unbalanced signals while permitting high amplification of balanced signals. The input or velocity signals from the electrodes 12 are applied directly to the grids 45 of the first stage 40 via leads 17' and 18'. The null or feedback signal from the potentiometer 14 is coupled to the cathodes 46 of the first stage 40 via a feedback transformer 47 in phase opposition to the velocity signal. After amplification in stages 41 and 42, the resultant signal is coupled through a transformer 48 for application to the phase sensitive detector 20.

The phase sensitive detector comprises four rectifiers 49, preferably germanium rectifiers, connected in a bridge circuit 50, all having their best conductivity in one direction around the closed loop and forming a ring modulator. Each leg of the bridge circuit has a series balancing or matching impedance 51 to balance the characteristics of the rectifiers. The amplified signal from the secondary 52 of transformer 48 is applied across opposite terminals 53 and 54 of the bridge ring modulator circuit 50; and the reference voltage across terminals 21 and 22 is applied across opposite terminals 55 and 56 of the modulator circuit via the secondary 57 of a reference voltage coupling transformer 58. The direct current output of the bridge modulator circuit 50 is taken from across the center taps 59 of the divided secondaries 52 and 57 of coupling transformers 48 and 58 and applied via terminals 60 and 61 to the polarity sensitive relay 23. As is understood in the art, the ring modulator circuit 50 will suppress the reference or carrier signal which serves only as a switch to pass the error or modulating signal from the amplifier 19.

In operation, the exciting coils of the rodmeter are supplied from the 50-cycle power supply in series with reference resistance 13. The voltage across this resistor is directly proportional to the rodmeter current and therefore has the same frequency, phase, and relative amplitude as the magnetic field in the water. The velocity signal detected by the pickup electrodes has the same functional relationship to the generated magnetic field. Thus the reference voltage and the velocity voltage have the same frequency and phase. It can be seen therefore that any speed voltage may be cancelled to zero by adding a certain proportion of the reference voltage in series opposition to the velocity signal. This is the function of the potentiometer 15. The function of the amplifier 19, detector 20 and motor 24 is to accurately determine the magnitude of that certain proportion.

Before the equipment is put into operation, it is calibrated by means of scale setting resistor 14 through independent speed measurements in a towing tank or for shipboard applications, over a measured mile course. Assuming any given signal voltage which is fed with a feedback voltage supplied from potentiometer 15 to the amplifier, then, since both are coupled to the amplifier 19 in phase opposition, as is evident from the connections of these voltages to grids 45 and cathodes 46 of stage 40 in the amplifier, the output of the amplifier will be reduced to zero.

The function of the phase sensitive detector 20 is to select that part of the amplifier output which is due to ship's speed and convert it to a direct current while eliminating extraneous voltages at other than 50-cycles. When the output of the amplifier 19 is zero as assumed above, the output of the detector 20 will be zero since the ring modulator circuit 50 will suppress the reference voltage, and hence the polarity sensitive relay 23 will remain in its neutral or zero set position.

When the velocity signal voltage is not balanced by the feedback voltage across the arm 16 of potentiometer 15, the error signal which depends on whether the velocity signal voltage is greater or less than the feedback voltage will be either in phase or 180° out of phase with the reference or carrier signal. The error signal will unbalance the bridge and the ring modulator 50 will pass only the modulating or error signal due to ship's speed; and the output polarity thereof will determine the directional movement of relay 23 from its zero position. Movement of the relay 23 controls the direction of rotation of the reversible motor 24 which adjusts the arm 16 of the potentiometer to null out the error voltage so that balance is again restored. As discussed heretofore, the shaft 31 connected to screw 32 and carriage 33, in combination with table 29 driven by timer 30 and roller 34 will convert positions to which the potentiometer arm has been adjusted to distance indications by integration performed through the position and rotation of roller 34 as indicated on distance indicator 36.

Obviously many modifications and variations of the present invention are possible in the light of the above teachings. It is therefore to be understood that within the scope of the appended claims the invention may be practiced otherwise than as specifically described.

What is claimed is:

1. An apparatus for measuring a ship's velocity and distance through water comprising a streamlined strut supported from said ship in a region of relatively undisturbed water flow; a longitudinal magnetic core and coil mounted within said strut for setting up in alternating magnetic field perpendicular to the direction of motion of said ship; electrodes symmetrically positioned on said strut with respect to said core in a region where the magnetic field is substantially parallel to said strut for detecting voltages induced in the water due to the motion of said magnetic field through the water; a power source for electrically energizing said coil and core; a potentiometer connected in series with said power source and coil whereby the voltage across said potentiometer will be in phase with the current through said coil; an amplifier having an input connected to said electrodes and an output; a phase sensitive detector including a rectifier bridge, ring modulator having one input connected to said amplifier output, another input connected across said potentiometer whereby said amplifier output may be detected in said modulator by said potentiometer voltage, and an output; means connected to the output of said detector for selecting an adjustable voltage from said potentiometer and applying said adjustable voltage to said amplifier input in phase opposition to said induced voltages, whereby said induced voltages are substantially cancelled; and a speed indicator and an integrating counter for indicating distance traveled connected to and operated by said last named means.

2. An apparatus for measuring a ship's velocity and distance through water according to claim 1 and further characterized by said means including a polarity sensitive relay and a reversible motor.

References Cited in the file of this patent

UNITED STATES PATENTS

| 2,435,043 | Lehde et al. | Jan. 27, 1948 |
| 2,729,103 | Raynsford | Jan. 3, 1956 |
| 2,757,538 | Soffel | Aug. 7, 1956 |
| 2,771,771 | Kamp | Nov. 27, 1956 |
| 2,844,568 | Mertz | July 22, 1958 |

OTHER REFERENCES

Wetmore: "Measure Flow Magnetically," Electronic Equipment, August 1955, p. 24–26.

Guelke: The Measurement of Sea-Water Velocities by Electromagnetic Induction, Journal of the Institute of Electrical Engineers, v. 94, pt. II, 1947, pp. 71–74.

Guelke: The Measurement of Sea-Water Velocities by Electromagnetic Induction, Journal of the Institute of Electrical Engineers, v. 94, pt. I, No. 77, May 1947, p. 232.

Chapman and Bartels: Geomagnetism; Oxford University Press 1940, pp. 445–448, 708–710.

Physical Basis of Bird Navigation, Journal of Applied Physics, March 1948, pp. 306–308.

Checking and Double-Checking; Air Force Magazine Navigation Devices, March 1943, pp. 8, 9, 33.